UNITED STATES PATENT OFFICE.

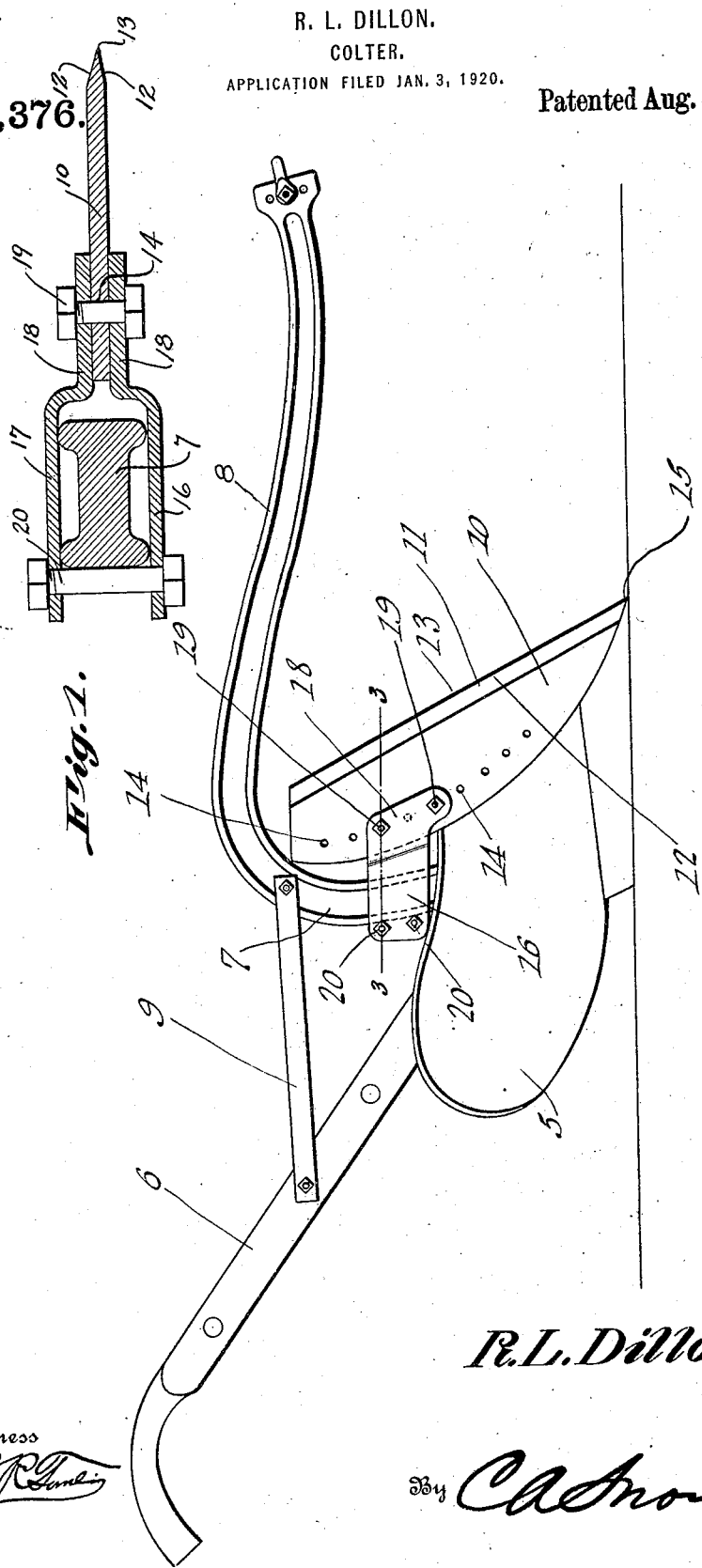

ROBERT L. DILLON, OF TIMPSON, TEXAS, ASSIGNOR OF FIFTY-ONE PER CENT. TO F. M. DAVIS OF TIMPSON, TEXAS.

COLTER.

1,351,376.  Specification of Letters Patent.  Patented Aug. 31, 1920.

Application filed January 3, 1920. Serial No. 349,139.

*To all whom it may concern:*

Be it known that I, ROBERT L. DILLON, a citizen of the United States, residing at Timpson, in the county of Shelby and State of Texas, have invented a new and useful Colter, of which the following is a specification.

This invention relates to plows and more particularly to a colter attachment for plows, and it is the primary object of the invention to provide a colter which may be adjusted to various angles with relation to the plow share to which the same is attached, thereby increasing the efficiency of the plow.

A further object of the invention is to provide a device of this character which may be readily and easily applied to the plow stock, by persons unfamiliar with mechanics.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a plow equipped with a colter constructed in accordance with the present invention;

Fig. 2 illustrates a transverse sectional view taken on line 3—3 of Fig. 1.

Referring to the drawings in detail, the device is shown as applied to a plow which includes the plow blade 5, handles 6 connected thereto in the usual manner, plow stock 7, and plow beam 8, the plow stock 7 having connection with the handles 6 through the medium of the brace rods 9.

The colter forming the subject matter of the invention includes a relatively long body portion 10 having a relatively straight front wall 11, which is beveled as at 12, to provide a cutting edge 13 for cutting the sod or weeds in front of the plow blade 5.

The rear wall 12 of the colter proper is curved throughout its length, so that the same will conform to curvature of the forward portion of the usual plow blade, so that the colter will be braced throughout substantially its entire length by the engagement with the plow blade 5.

Disposed within the colter 10, and arranged in parallel relation with the curved wall 12 thereof, is a line of openings 14, which openings extend from a point adjacent the upper end of the colter, to a point in spaced relation with the lower end thereof, and as shown this lower end of the colter is formed into a point 15 to permit the colter to find its way into the soil operated on by the plow.

Forming a part of the colter 10, are the supporting arms 16 and 17, which arms are provided with relatively straight colter engaging portions 18, apertured to receive the securing bolts 19 adapted to pass through registering openings in the colter and supporting arms 16 and 17.

These colter engaging portions 18 are of lengths to embrace a substantial portion of the colter 10, so that any possibility of the colter twisting with relation to its supporting arms, is absolutely eliminated.

As shown, these arms 16 and 17 lie in spaced relation with each other, and are each provided with a pair of spaced openings provided adjacent the inner end thereof, the distance between the arms 16 and 17, being great enough to accommodate the usual plow stock, the openings being provided to receive the securing bolts 20, which secure the arms 16 and 17 together, and lock the arms to the plow stock to which the device is applied.

From the foregoing it is obvious that if it becomes necessary to adjust the colter 10 with relation to the plow blade, it is only necessary to remove the bolts 19 and position the same in the openings of the colter blade to meet the requirments of the operator, it being of course apparent that the angle at which the colter operates, is determined by the condition of the soil in which the plow is to operate.

Having thus described the invention, what I claim as new is:—

In combination with a plow blade having a curved forward portion and having a stock for supporting the same, a colter having a pointed end and having a knife-like cutting edge, said colter having a curved rear portion and having a plurality of openings formed therein, the openings being disposed in spaced relation with each other and in a line in spaced relation with the curved rear portion, a pair of spaced arms having openings formed at their ends, means for securing the arms to the plow stock, and said openings adapted to register with the openings in the colter, and means extending through the registering openings for securing the colter to the arms.

In testimony that I claim the foregoing as my own, I have hereto affixed my signature in the presence of two witnesses.

ROBERT L. DILLON.

Witnesses:
  BLIETT GASWAY,
  Q. J. MOLLOY.